United States Patent
Liu et al.

(10) Patent No.: US 10,794,790 B2
(45) Date of Patent: Oct. 6, 2020

(54) LARGE-SCALE HIGH-SPEED ROTARY EQUIPMENT MEASURING AND NEURAL NETWORK LEARNING REGULATION AND CONTROL METHOD AND DEVICE BASED ON RIGIDITY VECTOR SPACE PROJECTION MAXIMIZATION

(71) Applicant: Harbin Institute of Technology, Harbin (CN)

(72) Inventors: Yongmeng Liu, Harbin (CN); Chuanzhi Sun, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 45 days.

(21) Appl. No.: 16/375,089

(22) Filed: Apr. 4, 2019

(65) Prior Publication Data
US 2020/0217739 A1    Jul. 9, 2020

(30) Foreign Application Priority Data
Jan. 7, 2019 (CN) .......................... 2019 1 0012773

(51) Int. Cl.
*G01M 1/24* (2006.01)
*G01M 1/20* (2006.01)
(Continued)

(52) U.S. Cl.
CPC ............... *G01M 1/24* (2013.01); *F01D 25/28* (2013.01); *G01M 1/20* (2013.01); *G06F 17/16* (2013.01);
(Continued)

(58) Field of Classification Search
CPC . G01M 1/24; G01M 1/20; G06N 3/00; G06N 3/04; G06N 3/08; G06N 3/02; F01D 25/28; G06F 17/16
See application file for complete search history.

(56) References Cited

U.S. PATENT DOCUMENTS 5,742,139 A * 4/1998 Kolomeitsev ........... H02P 25/08
                                                     318/254.2
5,966,927 A * 10/1999 Wilson ..................... F01D 5/021
                                                      60/39.43
(Continued)

*Primary Examiner* — Ramesh B Patel
(74) *Attorney, Agent, or Firm* — IPro, PLLC

(57) ABSTRACT

The present invention provides a large-scale high-speed rotary equipment measuring and neural network learning regulation and control method and device based on rigidity vector space projection maximization, belonging to the technical field of mechanical assembly. The method utilizes an envelope filter principle, a two-dimensional point set S, a least square method and a learning neural network to realize large-scale high-speed rotary equipment measuring and regulation and control. The device comprises a base, an air flotation shaft system, an aligning and tilt regulating workbench, precise force sensors, a static balance measuring platform, a left upright column, a right upright column, a left lower transverse measuring rod, a left lower telescopic inductive sensor, a left upper transverse measuring rod, a left upper telescopic inductive sensor, a right lower transverse measuring rod, a right lower lever type inductive sensor, a right upper transverse measuring rod and a right upper lever type inductive sensor. The method and the device can perform effective measuring and accurate regulation and control on large-scale high-speed rotary equipment.

6 Claims, 1 Drawing Sheet

(51) Int. Cl.
   *G06N 3/08*     (2006.01)
   *G06N 3/04*     (2006.01)
   *G06F 17/16*    (2006.01)
   *F01D 25/28*    (2006.01)
   *G06N 3/00*     (2006.01)
   *G06N 3/02*     (2006.01)

(52) U.S. Cl.
   CPC ............... *G06N 3/00* (2013.01); *G06N 3/04* (2013.01); *G06N 3/08* (2013.01); *G06N 3/02* (2013.01)

(56) References Cited

U.S. PATENT DOCUMENTS

| | | | |
|---|---|---|---|
| 6,000,840 A * | 12/1999 | Paterson | B01F 7/164 241/46.11 |
| 6,105,359 A * | 8/2000 | Wilson | F01D 5/021 60/772 |
| 6,164,908 A * | 12/2000 | Nishida | F01D 9/02 415/173.7 |
| 9,145,945 B2 * | 9/2015 | Tan | F16F 15/022 |
| 2010/0023307 A1 * | 1/2010 | Lee | G06K 9/6226 703/7 |
| 2016/0019459 A1 * | 1/2016 | Audhkhasi | G06N 3/08 706/22 |
| 2016/0034814 A1 * | 2/2016 | Audhkhasi | G06N 3/08 706/12 |
| 2017/0167866 A1 * | 6/2017 | Wang | F01D 25/285 |
| 2017/0175584 A1 * | 6/2017 | Tan | F01D 5/027 |
| 2019/0227528 A1 * | 7/2019 | Abbott | G05B 13/0265 |
| 2019/0242774 A1 * | 8/2019 | Trukenmueller | F16F 15/322 |
| 2019/0243735 A1 * | 8/2019 | He | G06N 3/0454 |
| 2020/0024790 A1 * | 1/2020 | Choung | D06F 33/00 |
| 2020/0217737 A1 * | 7/2020 | Sun | G01M 1/20 |

* cited by examiner

LARGE-SCALE HIGH-SPEED ROTARY EQUIPMENT MEASURING AND NEURAL NETWORK LEARNING REGULATION AND CONTROL METHOD AND DEVICE BASED ON RIGIDITY VECTOR SPACE PROJECTION MAXIMIZATION

TECHNICAL FIELD

The present invention relates to a large-scale high-speed rotary equipment measuring and neural network learning regulation and control method and device based on rigidity vector space projection maximization, belonging to the technical field of mechanical assembly.

BACKGROUND ART

As the performance requirements for the aircraft engine in China are continuously increased, the requirements for the assembly quality of the aircraft engine are also increased. The assembly quality of rotors directly influences the dynamic performance of the aircraft engine, and geometrical coaxiality, rigidity and initial unbalance after assembly are core parameters for checking the assembly quality of multistage rotor. When the aircraft engine operates at working rotation speed (for example, the working rotation speed of a civil aviation engine can generally reach 12,000 rpm or higher), the unbalance response caused by initial unbalance and coaxiality errors after assembly of multistage rotor will be amplified, thereby resulting in engine vibration and causing collision and friction between blades and a casing. The smaller the overall rigidity of the rotor is, the more severe the vibration is, and even serious failure of the aircraft engine may be caused. It can be known from the kinetic equation that increase of coaxiality and rigidity of the rotor structure and reduction of unbalance after assembly have important significance for reducing the weight of the rotor, improving the dynamic response properties of the rotor and improving the accuracy of the engine. The three objective optimization of coaxiality, rigidity and unbalance of the rotor is based on accurate prediction of the three parameters. Therefore, in order to improve and enhance the dynamic performance of the high-pressure combined rotors of the existing aircraft engine and meet the needs of development of a new generation of advanced aircraft engine, it is necessary to predict the three parameters of coaxiality, whole rigidity and unbalance of the high-pressure combined rotors. The existing prediction method basically has the problems that an assembly guidance model can not be proposed theoretically, the calculation processes are complicated, the design cost is too high, etc.

SUMMARY OF THE INVENTION

In order to solve the problems that the existing prediction method can not theoretically propose an assembly guidance model, the calculation processes are complicated and the design cost is too high, the present invention provides a large-scale high-speed rotary equipment measuring and neural network learning regulation and control method and device based on rigidity vector space projection maximization, specifically a large-scale high-speed rotary equipment measuring and neural network learning regulation and control method based on bending rigidity and tensile rigidity space projection maximization. The adopted technical scheme is as follows:

The method comprises:

step 1, obtaining a morphological filter based on non-equal interval sampling angles by utilizing the envelope filter principle, and extracting a rotor circular profile from a functional perspective; taking any point $P_1$ in a two-dimensional point set S, and enabling points which take the point $P_1$ as a start point and are less than $2\alpha$ from the point $P_1$ to constitute a subset $S_1$, wherein S is a two-dimensional space coordinate point set of circular profile sampling points, and $\alpha$ is an alpha disc radius;

step 2: taking any point $P_2$ in the subset $S_1$ so that two alpha discs which have a radius $\alpha$ and pass through the point $P_1$ and the point $P_2$ exist, wherein the locus equation of the centers of inner and outer circles of the alpha discs is $$\begin{cases} \rho_0 = \sqrt{x_0^2 + y_0^2} \\ \varphi_0 = \arctan\dfrac{y_0}{x_0} \end{cases} \text{or} \begin{cases} \rho_{0'} = \sqrt{x_{0'}^2 + y_{0'}^2} \\ \varphi_{0'} = \arctan\dfrac{y_{0'}}{x_{0'}} \end{cases}$$

wherein $P_0$ and $P_0'$ are the centers of circles of the two alpha discs respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) - H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) - H(\rho_1\cos\varphi_1 - \rho_2\cos\varphi_2) \end{cases}$$

$$H = \sqrt{\dfrac{\alpha^2}{(\rho_1\cos\varphi_1 - \rho_2\cos\varphi_2)^2 + (\rho_1\sin\varphi_1 - \rho_2\sin\varphi_2)^2} - \dfrac{1}{4}},$$

wherein $\rho_0$, $\varphi_0$, $\rho_{0'}$, $\varphi_{0'}$, $\rho_1$, $\varphi_1$, $\rho_2$ and $\varphi_2$ are polar diameters and polar angles of points $P_0$, $P_{0'}$, $P_1$ and $P_2$ in polar coordinate, respectively; $x_0$, $y_0$, $x_{0'}$ and $y_{0'}$ are coordinates of points $P_0$ and $P_{0'}$ in the X-axis direction and the Y-axis direction, respectively;

step 3: obtaining the relationship between an alpha envelope boundary $\partial H_\alpha(S)$ and sampling point polar coordinates $(\rho_i, \varphi_i)$ by utilizing the locus equation in the step 2, wherein the relationship between the alpha envelope boundary $\partial H_\alpha(S)$ and the sampling point polar coordinates $(\rho_i, \varphi_i)$ is expressed as $$\partial H_\alpha(S) = \sum_{i=1}^{n-1} F(\rho_i, \rho_{i+1}, \varphi_i, \varphi_{i+1})$$

wherein n is the number of the circular profile sampling points, and $\rho_i$ and $\varphi_i$ are polar diameters and polar angles of the point $P_i$ in polar coordinates, respectively; F is a non-equal interval morphological filter design rule based on an alpha shape theory;

step 4: performing validity processing on circular profile sampling data by the non-equal interval filter to obtain valid circular profile data; then, according to the valid circular profile data, fitting the rotor circular profile by utilizing a least square method, and evaluating the rotor offset to obtain the single-stage rotor offset;

step 5: as multistage rotor is formed by sequentially assembling all single stages of rotors, according to the single-stage rotor offset, determining the accumulated offset of the k stage rotor after nth stage rotor assembly by utilizing a multistage rotor vector stack projection theory, wherein the accumulated offset is expressed as $$\begin{bmatrix} dx_{0-k} \\ dy_{0-k} \end{bmatrix} = \begin{bmatrix} 1 & 0 & 0 \\ 0 & 1 & 0 \end{bmatrix} \cdot \sum_{i=1}^{k} \left( \prod_{j=2}^{i} S_{rj-1} S_{xj-1} S_{yj-1} \right) S_{ri}(p_i + dp_i)$$

wherein $dx_{0-k}$ is the accumulated offset of the circle center of a measuring surface of the kth stage rotor in the X-axis direction after nth stage rotor assembly; $dy_{0-k}$ is the accumulated offset of the circle center of a measuring surface of the n-stage rotor in the Y-axis direction after nth stage rotor assembly; $S_{xj-1}$ is a rotation matrix of a (j-1)th stage rotor/stator rotating for a $\theta_{xj-1}$ angle around the X-axis; $S_{yj-1}$ is a rotation matrix of the (j-1)th stage rotor/stator rotating for a $\theta_{yj-1}$ angle around the Y-axis; $p_i$ is an ideal location vector of the circle center of a radial measuring surface of the ith stage rotor; $dp_i$ is a processing error vector of the circle center of the radial measuring surface of the ith stage rotor, $S_{rj-1}$ is a rotation matrix of the (j-1)th stage rotor/stator rotating for a $\theta_{rj-1}$ angle around the Z-axis; $S_{r1}$ is a unit matrix;

step 6: according to the ISO standard definition of coaxiality, determining the expression of the coaxiality of the nth stage rotor after assembly, wherein the expression of the cross-sectional area S of the contact surface between rotors after assembly and the expression of the cross-sectional inertia moment I of the assembly contact surface between two stages of rotors after assembly are respectively $$\text{coaxiality} = \max\{2\sqrt{(dx_{0-k})^2 + (dy_{0-k})^2}, k=1,2,\ldots,n\}$$

$$S = \pi^*(R^2 - r^2)/4 - 2 * \int_0^{de} \int_0^{d\theta} \pi^*(R^2 - r^2)/4 \, de d\theta$$

$$I = \pi^*(R^4 - r^4)/64 - 2 * \int_0^{de} \int_0^{d\theta} \pi^*(R^4 - r^4)/64 \, de d\theta,$$

wherein R is the outer diameter of contact surface, r is a contact surface inner diameter, bending rigidity is EI; eccentricity $de = \sqrt{(dx_{0-n})^2 + (dy_{0-n})^2}$, eccentric angle $d\theta = \arctan(dy_{0-n}/dx_{0-n})$, multistage rotor tensile rigidity is ES, and E is elastic modulus of the material;

step 7, in multistage rotor assembly, as offsets of single stages of rotors re transmitted and accumulated so as to influence the unbalance after multistage rotor assembly, determining the amount of unbalance of the nth rotor caused by the offset of each stage of rotor, wherein the expression of the amount of unbalance of the nth rotor is $$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i)$$

wherein $Ux_{0-n}$ is the unbalance of a measuring surface of the nth stage rotor in the X-axis direction after assembly; $Uy_{0-n}$ is the unbalance of the measuring surface of the nth stage rotor in the Y-axis direction after assembly; $m_{0-n}$ is the mass of the nth stage rotor after assembly; $p_i$ is an ideal location vector of the circle center of a radial measuring surface of the h stage rotor; $dp_i$ is a processing error vector of the circle center of the radial measuring surface of the ith stage rotor;

step 8, enabling the unbalance of the single stage rotor and the unbalance introduced by the offset of each stage of rotor in the assembly process to be subjected to vector addition to obtain the unbalance of any stage of rotor after multistage rotor assembly; then, respectively projecting the unbalance of each stage of rotor to two correction surfaces, synthesizing the unbalance according to a dynamic balance formula, and establishing a prediction model of the unbalance of multistage rotor; and step 9, establishing an intelligent learning neural network by utilizing the prediction model obtained in step 8, and combining with assembly environment influence factors such as temperature and humidity and simultaneously combining with assembly process influence factors such as the tightening torque and tightening sequence of bolts as well as the elastic modulus, height and contact surface radius of the equipment material; and finally, combining the prediction model with the intelligent learning neural network to complete large-scale high-speed rotary equipment measuring and neural network learning regulation and control.

Further, the neural network in step 9 is a BP neural network prediction model which takes error factors such as temperature, humidity, tightening torque, orientation error, localization error, unbalance measuring error, cross-sectional area, correction surface location, bolt tightening sequence, material elastic modulus, height and contact surface radius of each stage of rotor as input variables, and takes coaxiality, tensile rigidity, bending rigidity and unbalance after rotor assembly as output variables; the BP neural network prediction model is provided with two hidden layers, and each hidden layer has 40 hidden layer nodes.

Further, the establishment process of the neural network comprises selection of neuron activation functions, setting of number of hidden layer network nodes and setting of number of hidden layers.

Further, the neuron activation functions select the tansig function as an activation function of the hidden layers and select the purelin function as an activation function of an output layer, wherein the prototypes of the tansig and purelin functions are respectively as follows:

$$f(x) = \frac{2}{1+e^{-2x}} - 1$$

$$f(x) = x$$

Further, the setting of number of the hidden layer network nodes and the setting of number of the hidden layers are as follows: the network prediction error is set to be 0.0001, and the number of the hidden layer nodes is twice the number of input layer nodes; four network layers are set; and the first hidden layer has 30 nodes, and the second hidden layer has 30 nodes.

A large-scale high-speed rotary equipment measuring and neural network learning regulation and control device for realizing the method adopts the following technical scheme:

The device comprises a base 1, an air flotation shaft system 2, a aligning and tilt regulating workbench 3, precise force sensors 4a, 4b, 4c, a static balance measuring platform 5, a left upright column 6, a right upright column 7, a left lower transverse measuring rod 8, a left lower telescopic inductive sensor 9, a left upper transverse measuring rod 10, a left upper telescopic inductive sensor 11, a right lower transverse measuring rod 12, a right lower lever type inductive sensor 13, a right upper transverse measuring rod 14 and a right upper lever type inductive sensor 15; the air flotation shaft system 2 is nested in the center position of the base 1; the aligning and tilt regulating workbench 3 is arranged in the center position of the air flotation shaft system 2; the three precise force sensors 4a, 4b, 4c are uniformly arranged on the aligning and tilt regulating workbench 3; the static balance measuring platform 5 is arranged on the three precise force sensors 4a, 4b, 4c; the left upright column 6 and the right upright column 7 are symmetrically distributed at two sides of the air flotation shaft system 2 and are fixedly arranged on the base 1; the left upright column 6 is sleeved with the left upper transverse measuring rod 10 and the left lower transverse measuring rod 8 sequentially from top to bottom in a mode of movable regulation; the left upper telescopic inductive sensor 11 is fixedly connected with the left upper transverse measuring rod 10; the left lower telescopic inductive sensor 9 is fixedly connected with the left lower transverse measuring rod 8; the right upright column 7 is sleeved with the right upper transverse measuring rod 14 and the right lower transverse measuring rod 12 sequentially from top to bottom in a mode of movable regulation; the right upper lever type inductive sensor 15 is fixedly connected with the right upper transverse measuring rod 14; and the right lower lever type inductive sensor 13 is fixedly connected with the right lower transverse measuring rod 12.

The present invention has the following beneficial effects:

The large-scale high-speed rotary equipment measuring and regulation and control method based on bending rigidity and tensile rigidity space projection maximization, provided by the present invention, analyzes the sampling angle distribution properties and the measuring error of single-stage rotor circular profile measuring, performs functional filtering on the collected circular profile data through a non-equal interval morphological filter, obtains the offset of the contact surface between all stages of rotors according to the transmission relationship between multistage rotors, calculates a coaxiality prediction result according to a coaxiality formula, calculates the cross-sectional area and the cross-sectional inertia moment of the contact surface, obtains a rigidity prediction result according to tensile rigidity and bending rigidity formulae, obtains a rotor unbalance prediction result according to the transmission relationship between rotor errors, and finally realizes performance prediction of multistage rotors of an aircraft engine based on non-equal interval filter technique. The large-scale high-speed rotary equipment measuring and regulation and control device based on bending rigidity and tensile rigidity space projection maximization, provided by the present invention, can perform effective measuring and accurate regulation and control on large-scale high-speed rotary equipment.

Figure 1:
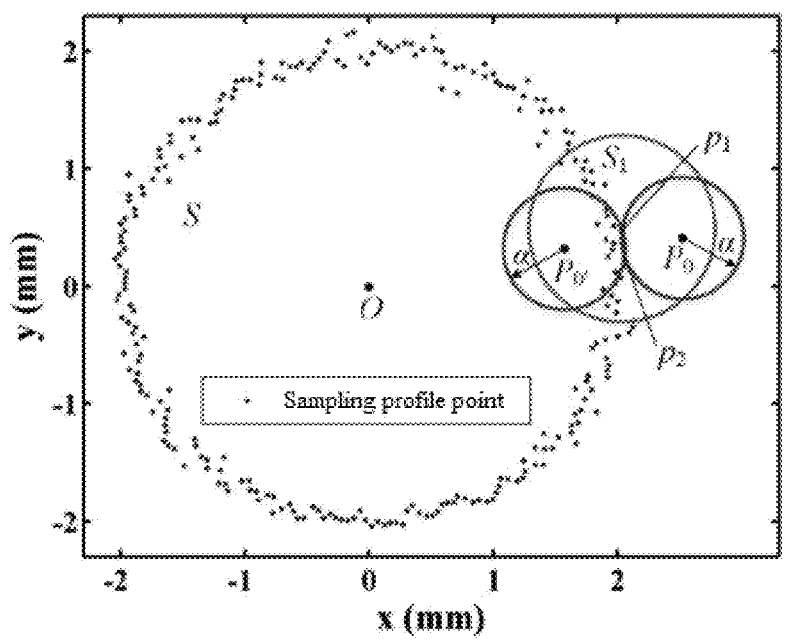
FIG. 1 is a schematic diagram of space distribution of the two-dimensional point set S of the present invention, wherein O is the circle center of a sampling profile, S is a two-dimensional space coordinate point set of circular profile sampling points, $P_1$ is any point in the two-dimensional point set S, $S_1$ is a point set constituted by points which take the point $P_1$ as a start point and are less than $2\alpha$ from the point $P_1$, $\alpha$ is an alpha disc radius, $P_2$ is any point in the point set $S_1$, and $P_0$ and $P_0'$ are respectively centers of circles of two alpha discs.

(base 1, air flotation shaft system 2, aligning and tilt regulating workbench 3, precise force sensors 4a, 4b, 4c, static balance measuring platform 5, left upright column 6, right upright column 7, left lower transverse measuring rod 8, left lower telescopic inductive sensor 9, left upper transverse measuring rod 10, left upper telescopic inductive sensor 11, right lower transverse measuring rod 12, right lower lever type inductive sensor 13, right upper transverse measuring rod 14, right upper lever type inductive sensor 15).

DETAILED DESCRIPTION OF THE INVENTION

The present invention is further illustrated by the following specific embodiments, but the present invention is not limited by the embodiments.

Embodiment 1

The large-scale high-speed rotary equipment measuring and neural network learning regulation and control method based on bending rigidity and tensile rigidity space projection maximization adopts the following technical scheme:

The method comprises:

step 1, obtaining a morphological filter based on non-equal interval sampling angles by utilizing an envelope filter principle, and extracting a rotor circular profile from the functional perspective; taking any point $P_1$ in a two-dimensional point set S, and enabling points which take the point $P_1$ as a start point and are less than $2\alpha$ from the point $P_1$ to constitute a subset $S_1$, wherein S is a two-dimensional space coordinate point set of circular profile sampling points, and $\alpha$ is an alpha disc radius;

step 2: taking any point $P_2$ in the subset $S_1$ so that two alpha discs which have a radius $\alpha$ and pass through the point $P_1$ and the point $P_2$ exist, wherein the locus equation of the centers of inner and outer circles of the alpha discs is $$\begin{cases} \rho_0 = \sqrt{x_0^2 + y_0^2} \\ \varphi_0 = \arctan\dfrac{y_0}{x_0} \end{cases} \text{ or } \begin{cases} \rho_{0'} = \sqrt{x_{0'}^2 + y_{0'}^2} \\ \varphi_{0'} = \arctan\dfrac{y_{0'}}{x_{0'}} \end{cases}$$

wherein $P_0$ and $P_0'$ are the centers of circles of the two alpha discs respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) - H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) - H(\rho_1\cos\varphi_1 - \rho_2\cos\varphi_2) \end{cases}$$

$$H = \sqrt{\dfrac{\alpha^2}{(\rho_1\cos\varphi_1 - \rho_2\cos\varphi_2)^2 + (\rho_1\sin\varphi_1 - \rho_2\sin\varphi_2)^2} - \dfrac{1}{4}},$$

wherein $\rho_0$, $\varphi_0$, $\rho_{0'}$, $\varphi_{0'}$, $\rho_1$, $\varphi_1$, $\rho_2$, and $\varphi_2$ are polar diameters and polar angles of points $P_0$, $P_{0'}$, $P_1$ and $P_2$ in polar coordinates, respectively; $x_0$, $y_0$, $x_{0'}$ and $y_{0'}$ are coordinates of points $P_0$ and $P_{0'}$ in the X-ads direction and the Y-axis direction, respectively;

step 3: obtaining the relationship between an alpha envelope boundary $\partial H_\alpha(S)$ and sampling point polar coordinates $(\rho_i, \varphi_i)$ by utilizing the locus equation in step 2, wherein the relationship between the alpha envelope boundary $\partial H_\alpha(S)$ and the sampling point polar coordinates $(\rho_i, \varphi_i)$ is expressed as $$\partial H_\alpha(S) = \sum_{i=1}^{n-1} F(\rho_i, \rho_{i+1}, \varphi_i, \varphi_{i+1})$$

wherein n is the number of the circular profile sampling points, and $\rho_i$ and $\varphi_i$ are polar diameters and polar angles of the point $P_i$ in polar coordinates, respectively; F is a non-equal interval morphological filter design rule based on an alpha shape theory;

step 4: performing validity processing on circular profile sampling data by the non-equal interval filter to obtain valid circular profile data; then, according to the valid circular profile data, fitting the rotor circular profile by utilizing a least square method, and evaluating the rotor offset to obtain the single-stage rotor offset;

step 5: as multistage rotors are formed by sequentially assembling all single stages of rotors, according to the single-stage rotor offset, determining the accumulated offset of the kth stage rotor after nth stage rotor assembly by utilizing a multistage rotor vector stack projection theory, wherein the accumulated offset is expressed as $$\begin{bmatrix} dx_{0-k} \\ dy_{0-k} \end{bmatrix} = \begin{bmatrix} 1 & 0 & 0 \\ 0 & 1 & 0 \end{bmatrix} \cdot \sum_{i=1}^{k} \left( \prod_{j=2}^{i} S_{rj-1} S_{xj-1} S_{yj-1} \right) S_{ri}(p_i + dp_i)$$

wherein $dx_{0-k}$ is the accumulated offset of the circle center of a measuring surface of the kth stage rotor in the X-axis direction after nth stage rotor assembly; $dy_{0-k}$ is the accumulated offset of the circle center of a measuring surface of the nth stage rotor in the Y-axis direction after nth stage rotor assembly; $S_{xj-1}$ is a rotation matrix of a (j-1)th stage rotor/stator rotating for a $\theta_{xj-1}$ angle around the X-axis; $S_{yj-1}$ is a rotation matrix of the (j-1)th stage rotor/stator rotating for a $\theta_{yj-1}$ angle around the Y-axis; $p_i$ is an ideal location vector of the circle center of a radial measuring surface of the ith stage rotor, $dp_i$ is a processing error vector of the circle center of the radial measuring surface of the ith stage rotor, $S_{rj-1}$ is a rotation matrix of the (j-1)th stage rotor/stator rotating for a $\theta_{rj-1}$ angle around the Z-axis; $S_{r1}$ is a unit matrix;

step 6: according to the ISO standard definition of coaxiality, determining the expression of the coaxiality of the nth stage rotor after assembly, wherein the expression of the cross-sectional area S of the contact surface between rotors after assembly and the expression of the cross-sectional inertia moment I of the assembly contact surface between two stages of rotors after assembly are respectively coaxiality=max$\{2\sqrt{(dx_{0-k})^2+(dy_{0-k})^2}, k=1,2,\ldots,n\}$ $S=\pi*(R^2-r^2)/4 - 2*\int_0^{de}\int_0^{d\theta} \pi*(R^2-r^2)/4 \, de d\theta$ $I=\pi*(R^4-r^4)/64 - 2*\int_0^{de}\int_0^{d\theta} \pi*(R^4-r^4)/64 \, de d\theta$ wherein R is the outer diameter of contact surface, r is a contact surface inner diameter, bending rigidity is EI; eccentricity de=$\sqrt{(dx_{0-n})^2+(dy_{0-n})^2}$, eccentric angle d$\theta$=arctan$(dy_{0-n}/dx_{0-n})$, multistage rotor tensile rigidity is ES, and E is elastic modulus of the material;

step 7, in multistage rotor assembly, as offsets of single stages of rotors are transmitted and accumulated so as to influence the unbalance after multistage rotor assembly, determining the amount of unbalance of the nth rotor caused by the offset of each stage of rotor, wherein the expression of the amount of unbalance of the nth rotor is $$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i),$$

wherein $Ux_{0-n}$ is the unbalance of a measuring surface of the nth stage rotor in the X-axis direction after assembly; $Uy_{0-n}$ is the unbalance of the measuring surface of the nth stage rotor in the Y-axis direction after assembly; $m_{0-n}$ is the mass of the nth stage rotor after assembly; $p_i$ is an ideal location vector of the circle center of a radial measuring surface of the ith stage rotor; $dp_i$ is a processing error vector of the circle center of the radial measuring surface of the ith stage rotor;

step 8, enabling the unbalance of the single stage rotor and the unbalance introduced by the offset of each stage of rotor in the assembly process to be subjected to vector addition to obtain the unbalance of any stage of rotor after multistage rotor assembly; then, respectively projecting the unbalance of each stage of rotor to two correction surfaces, synthesizing the unbalance according to a dynamic balance formula, and establishing a prediction model of the unbalance of multistage rotor;

step 9, establishing an intelligent learning neural network by utilizing the prediction model obtained in step 8, and combining with assembly environment influence factors such as temperature and humidity and simultaneously combining with assembly process influence factors such as the tightening torque and tightening sequence of bolts as well as the elastic modulus, height and contact surface radius of the equipment material; and finally, combining the prediction model with the intelligent learning neural network to complete large-scale high-speed rotary equipment measuring and neural network learning regulation and control.

In the present embodiment, according to the formulae in the above steps 1 to 8, a prediction model of coaxiality, tensile rigidity, bending rigidity and unbalance of multistage rotor can be obtained, and the optimal assembly phase of each stage of rotor can be determined so as to realize prediction of coaxiality, tensile rigidity, bending rigidity and unbalance of multistage rotor of the aircraft engine.

In field assembly, coaxiality, tensile rigidity, bending rigidity and unbalance after assembly of the large-scale high-speed rotary equipment have coupling influence with temperature and humidity in the assembly environment as well as multiple factors such as the tightening torque and tightening sequence of bolts and the elastic modulus, height and contact surface radius of the equipment material in the assembly process, and a deviation exists between the prediction model and the actual measured value. In order to realize accurate prediction of robustness under different influence factors by a network model and reduce prediction errors, an intelligent learning neural network is established so as to realize intelligent assembly of multistage rotor. The establishment process of the neural network mainly comprises selection of neuron activation functions, setting of number of hidden layer network nodes and setting of number of hidden layers.

(1) Selection of the activation functions: the tansig function has the characteristics of non-linearity, differentiability and monotonicity and effectively ensures that the update of the weight in network iteration is a gentle iteration change instead of a mutation, and the function output interval is [−1, 1], thereby being favorable for network convergence. The purelin function has good linearity, serves as an output layer function, and effectively keeps amplification and reduction of any input node value and simplifies the comparison of an output value and a sample value, thereby being favorable for improving the algorithm efficiency. In order to enhance the network non-linearity and simultaneously improve the algorithm efficiency, the tansig function is selected as the activation function of the hidden layers, and the purelin function is selected as the activation function of the output layer.

The prototypes of the tansig and purelin functions are respectively as shown in formulae (1) and (2)

$$f(x) = \frac{2}{1+e^{-2x}} - 1 \quad (1)$$

$$f(x) = x. \quad (2)$$

(2) Selection of number of network layers and number of hidden layer network nodes The increase of the number of the neural network nodes and the number of the hidden layers can reduce the network prediction error and improve the prediction accuracy but simultaneously can complicate the network, increase the network training time, reduce the algorithm efficiency and easily cause over-fitting. The network prediction error is set to be 0.0001, the number of the hidden layer nodes is set to be twice the number of the input layer nodes, and the number of the network layers is increased gradually to observe the network convergence effect. Similarly, the network prediction error is set to be 0.0001, the number of the network layers is set to be 3, and the number of the hidden layer nodes is increased gradually to observe the network convergence effect. Many experiments determine that the number of the network layers is 4, the first hidden layer has 30 nodes, and the second hidden layer has 30 nodes.

Therefore, based on multi-factor coupling properties such as temperature, humidity, tightening torque, orientation error, localization error, unbalance measuring error, cross-sectional area, correction surface location, bolt tightening sequence, material elastic modulus, rotor height and contact surface radius in the assembly process of the large-scale high-speed rotary equipment, a BP neural network prediction model is established, which takes error factors such as temperature, humidity, tightening torque, orientation error, localization error, unbalance measuring error, cross-sectional area, correction surface location, bolt tightening sequence, material elastic modulus, height and contact surface radius of each stage of rotor as input variables and takes coaxiality, tensile rigidity, bending rigidity and unbalance after rotor assembly as output variables; the BP neural network prediction model is provided with two hidden layers, and each hidden layer has 40 hidden layer nodes, thereby realizing intelligent assembly of rotors.

1,000 groups of fourth stage rotor data are adopted to perform experiments, wherein 600 groups of data are used as neural network model training data, 200 groups of data are used as model validity verification data, and 200 groups of data are used as model test data. When the neural network is iterated to 100 generations, the network prediction error does not exceed 0.0001. In correlation tests, the regression coefficients R of neural network prediction coaxiality, tensile rigidity, bending rigidity and unbalance values and the values in actual assembly of four-stage rotors are greater than 0.9, thereby meeting the network convergence requirement.

Embodiment 2

Figure 2:
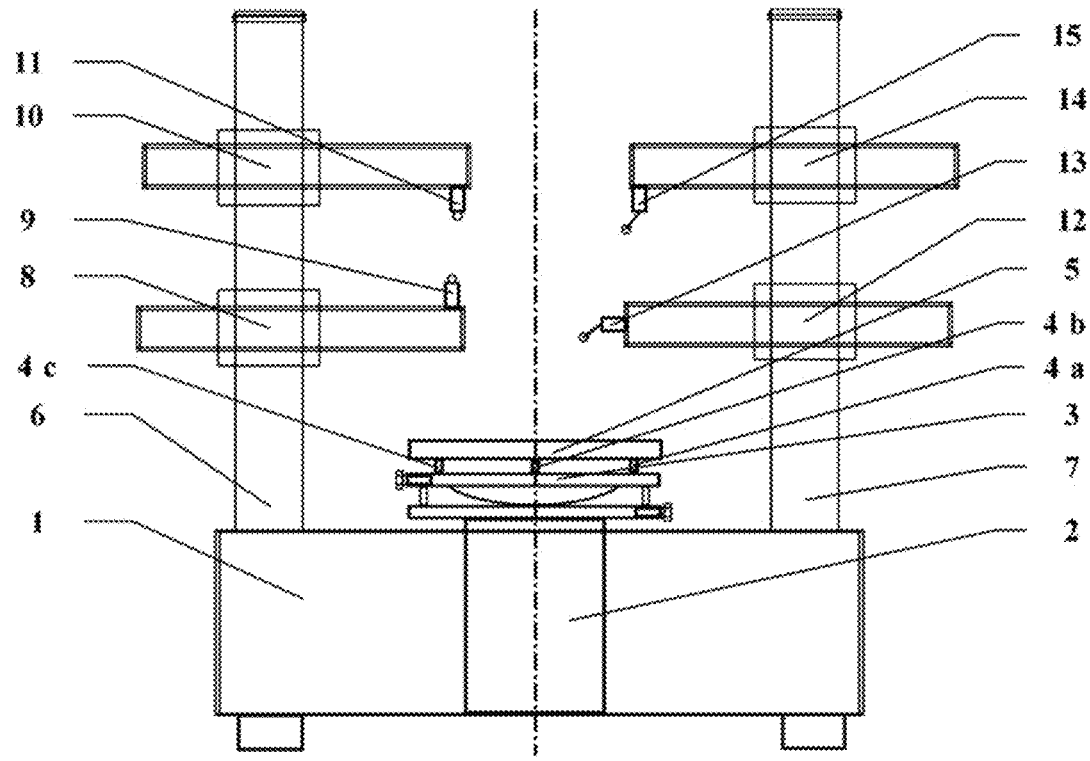
FIG. 2 is a structural schematic diagram of the measuring and regulation and control device of the present invention.

A large-scale high-speed rotary equipment measuring and neural network learning regulation and control device for realizing the method is as shown in FIG. 2. The device comprises a base 1, an air flotation shaft system 2, an aligning and tilt regulating workbench 3, precise force sensors 4a, 4b, 4c, a static balance measuring platform 5, a left upright column 6, a right upright column 7, a left lower transverse measuring rod 8, a left lower telescopic inductive sensor 9, a left upper transverse measuring rod 10, a left upper telescopic inductive sensor 11, a right lower transverse measuring rod 12, a right lower lever type inductive sensor 13, a right upper transverse measuring rod 14 and a right upper lever type inductive sensor 15; the air flotation shaft system 2 is nested in the center position of the base 1; the aligning and tilt regulating workbench 3 is arranged in the center position of the air flotation shaft system 2; the three precise force sensors 4a, 4b, 4c are uniformly arranged on the aligning and tilt regulating workbench 3; the static balance measuring platform 5 is arranged on the three precise force sensors 4a, 4b, 4c; the left upright column 6 and the right upright column 7 are symmetrically distributed at two sides of the air flotation shaft system 2 and are fixedly arranged on the base 1; the left upright column 6 is sleeved with the left upper transverse measuring rod 10 and the left lower transverse measuring rod 8 sequentially from top to bottom in a mode of movable regulation; the left upper telescopic inductive sensor 11 is fixedly connected with the left upper transverse measuring rod 10; the left lower telescopic inductive sensor 9 is fixedly connected with the left lower transverse measuring rod 8; the right upright column 7 is sleeved with the right upper transverse measuring rod 14 and the right lower transverse measuring rod 12 sequentially from top to bottom in a mode of movable regulation; the right upper lever type inductive sensor 15 is fixedly connected with the right upper transverse measuring rod 14; and the right lower lever type inductive sensor 13 is fixedly connected with the right lower transverse measuring rod 12.

Although the present invention has been disclosed in the above exemplary embodiments, it is not intended to limit the present invention. Any person skilled in the art can make various changes and modifications without departing from the spirits and scope of the present invention. Therefore, the scope of protection of the present invention should be determined by the scope of the claims.

The invention claimed is:

1. A large-scale high-speed rotary equipment measuring and neural network learning regulation and control method based on rigidity vector space projection maximization, comprising:

step 1: obtaining a morphological filter based on non-equal interval sampling angles by utilizing an envelope filter principle, and extracting a rotor circular profile from a functional perspective; taking any point $P_1$ in a two-dimensional point set S, and enabling points which take the point $P_1$ as a start point and are less than $2\alpha$ from the point $P_1$ to constitute a subset $S_1$, wherein S is a two-dimensional space coordinate point set of circular profile sampling points, and $\alpha$ is an alpha disc radius;

step 2: taking any point $P_2$ in the subset $S_1$ so that two alpha discs which have a radius $\alpha$ and pass through the point $P_1$ and the point $P_2$ exist, wherein the locus equation of the centers of inner and outer circles of the alpha discs is $$\begin{cases} \rho_0 = \sqrt{x_0^2 + y_0^2} \\ \varphi_0 = \arctan\dfrac{y_0}{x_0} \end{cases} \text{ or } \begin{cases} \rho_{0'} = \sqrt{x_{0'}^2 + y_{0'}^2} \\ \varphi_{0'} = \arctan\dfrac{y_{0'}}{x_{0'}} \end{cases}$$

wherein $P_0$ and $P_0'$ are the centers of circles of the two alpha discs respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) - H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) - H(\rho_1\cos\varphi_1 - \rho_2\cos\varphi_2) \end{cases}$$

$$H = \sqrt{\dfrac{\alpha^2}{(\rho_1\cos\varphi_1 - \rho_2\cos\varphi_2)^2 + (\rho_1\sin\varphi_1 - \rho_2\sin\varphi_2)^2} - \dfrac{1}{4}},$$

wherein, $\rho_0$, $\varphi_0$, $\rho_{0'}$, $\varphi_{0'}$, $\rho_1$, $\varphi_1$, $\rho_2$, and $\varphi_2$ are polar diameters and polar angles of points $P_0$, $P_{0'}$, $P_1$ and $P_2$ in polar coordinates, respectively; $x_0$, $y_0$, $x_{0'}$ and $y_{0'}$ are coordinates of points $P_0$ and $P_{0'}$ in an X-axis direction and a Y-axis direction, respectively;

step 3: obtaining a relationship between an alpha envelope boundary $\partial H_\alpha(S)$ and sampling point polar coordinates $(\rho_i,\varphi_i)$ by utilizing the locus equation in the step 2, wherein the relationship between the alpha envelope boundary $\partial H_\alpha(S)$ and the sampling point polar coordinates $(\rho_i,\varphi_i)$ is expressed as $$\partial H_\alpha(S) = \sum_{i=1}^{n-1} F(\rho_i, \rho_{i+1}, \varphi_i, \varphi_{i+1}),$$

wherein n is the number of the circular profile sampling points, and $\rho_i$ and $\varphi_i$ are respectively the polar diameter and the polar angle of a point $P_i$ in the polar coordinates; F is a non-equal interval morphological filter design rule based on an alpha shape theory;

step 4: performing validity processing on circular profile sampling data by the non-equal interval filter to obtain valid circular profile data; then, according to the valid circular profile data, fitting the rotor circular profile by utilizing a least square method, and evaluating the rotor offset to obtain single-stage rotor offset;

step 5: according to the single-stage rotor offset, determining the accumulated offset of a kth stage rotor after an nth stage rotor assembly by utilizing a multistage rotor vector stack projection theory, wherein the accumulated offset is expressed as $$\begin{bmatrix} dx_{0-k} \\ dy_{0-k} \end{bmatrix} = \begin{bmatrix} 1 & 0 & 0 \\ 0 & 1 & 0 \end{bmatrix} \cdot \sum_{i=1}^{k}\left(\prod_{j=2}^{i} S_{rj-1}S_{xj-1}S_{yj-1}\right)S_{ri}(p_i + dp_i),$$

wherein, $dx_{0-k}$ is the accumulated offset of the circle center of a measuring surface of the kth stage rotor in the X-axis direction after nth stage rotor assembly; $dy_{0-k}$ is the accumulated offset of the circle center of the measuring surface of the nth stage rotor in the Y-axis direction after nth stage rotor assembly; $S_{xj-1}$ is a rotation matrix of a (j-1)th stage rotor/stator rotating for a $\theta_{xj-1}$ angle around the X-axis; $S_{yj-1}$ is a rotation matrix of the (j-1)th stage rotor/stator rotating for a $\theta_{yj-1}$ angle around the Y-axis; $p_i$ is an ideal location vector of the circle center of a radial measuring surface of an ith stage rotor; $dp_i$ is a processing error vector of the circle center of the radial measuring surface of the ith stage rotor; $S_{rj-1}$ is a rotation matrix of the (j-1)th stage rotor/stator rotating for a $\theta_{rj-1}$ angle around the Z-axis; and $S_{r1}$ is a unit matrix;

step 6: according to the ISO standard definition of coaxiality, determining the expression of the coaxiality of the nth stage rotor after assembly, wherein the expression of the cross-sectional area S of the contact surface between rotors after assembly and the expression of the cross-sectional inertia moment I of the assembly contact surface between two stages of rotors after assembly are respectively:

$$\text{coaxiality} = \max\{2\sqrt{(dx_{0-k})^2 + (dy_{0-k})^2}, k=1,2,\ldots,n\}$$

$$S = \pi^*(R^2 - r^2)/4 - 2^*\int_0^{d e}\int_0^{d\theta}\pi^*(R^2 - r^2)/4 \, de \, d\theta$$

$$I = \pi^*(R^4 - r^4)/64 - 2^*\int_0^{d e}\int_0^{d\theta}\pi^*(R^4 - r^4)/64 \, de \, d\theta,$$

wherein, R is the outer diameter of contact surface, r is a contact surface inner diameter, bending rigidity is EI; eccentricity $de = \sqrt{(dx_{0-n})^2 + (dy_{0-n})^2}$, eccentric angle $d\theta = \arctan(dy_{0-n}/dx_{0-n})$, multistage rotor tensile rigidity is ES, and E is elastic modulus of the material;

step 7: determining the amount of unbalance of an nth rotor caused by the offset of each of stage rotor, wherein the expression of the amount of unbalance of the nth rotor is:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n}\left(\prod_{j=2}^{i} S_{rj-1}S_{xj-1}S_{yj-1}\right)S_{ri}(p_i + dp_i),$$

wherein, $Ux_{0-n}$ is the unbalance of a measuring surface of the nth stage rotor in the X-axis direction after assembly; $Uy_{0-n}$ is the unbalance of the measuring surface of the nth stage rotor in the Y-axis direction after assembly; $m_{0-n}$ is the mass of the nth stage rotor after assembly; $p_i$ is an ideal location vector of the circle center of a radial measuring surface of the ith stage rotor; $dp_i$ is a processing error vector of the circle center of the radial measuring surface of the ith stage rotor;

step 8, enabling the unbalance of the single stage rotor and the unbalance introduced by the offset of each stage of rotor in the assembly process to be subjected to vector addition to obtain the unbalance of any stage of rotor after multistage rotor assembly; then, respectively projecting the unbalance of each stage of rotor to two correction surfaces, synthesizing the unbalance according to a dynamic balance formula, and establishing a prediction model of the unbalance of multistage rotor; and step 9, establishing an intelligent learning neural network by utilizing the prediction model obtained in step 8, and combining with assembly environment influence factors such as temperature and humidity and simultaneously combining with assembly process influence factors such as the tightening torque and tightening sequence of bolts as well as the elastic modulus, height and contact surface radius of the equipment material; and finally, combining the prediction model with the intelligent learning neural network to complete large-scale high-speed rotary equipment measuring and neural network learning regulation and control.

2. The method of claim 1, wherein the neural network in step 9 is a BP neural network prediction model which takes error factors such as temperature, humidity, tightening torque, orientation error, localization error, unbalance measuring error, cross-sectional area, correction surface location, bolt tightening sequence, material elastic modulus, height and contact surface radius of each stage of rotor as input variables, and takes coaxiality, tensile rigidity, bending rigidity and unbalance after rotor assembly as output variables; the BP neural network prediction model is provided with two hidden layers, and each hidden layer has 40 hidden layer nodes.

3. The method of claim 1, wherein the establishment process of the neural network comprises selection of a neuron activation function, setting of number of hidden layer network nodes and setting of number of hidden layers.

4. The method of claim 3, wherein the neuron activation function selects the tansig function as an activation function of the hidden layers and selects the purelin function as an activation function of an output layer, wherein the prototypes of the tansig and purelin functions are respectively as follows:

$$f(x) = \frac{2}{1+e^{-2x}} - 1$$
$$f(x) = x.$$

5. The method of claim 2, wherein the setting of number of the hidden layer network nodes and the setting of number of the hidden layers are as follows: the network prediction error is set to be 0.0001, and the number of the hidden layer nodes is twice the number of input layer nodes; four network layers are set; and the first hidden layer has 30 nodes, and the second hidden layer has 30 nodes.

6. A large-scale high-speed rotary equipment measuring and neural network learning regulation and control device, wherein the device comprises a base, an air flotation shaft system, an aligning and tilt regulating workbench, precise force sensors, a static balance measuring platform, a left upright column, a right upright column, a left lower transverse measuring rod, a left lower telescopic inductive sensor, a left upper transverse measuring rod, a left upper telescopic inductive sensor, a right lower transverse measuring rod, a right lower lever type inductive sensor, a right upper transverse measuring rod and a right upper lever type inductive sensor;

wherein the air flotation shaft system is nested in the center position of the base;

wherein the aligning and tilt regulating workbench is arranged in the center position of the air flotation shaft system;

wherein the three precise force sensors are uniformly arranged on the aligning and tilt regulating workbench;

wherein the static balance measuring platform is arranged on the three precise force sensors;

wherein the left upright column and the right upright column are symmetrically distributed at two sides of the air flotation shaft system and are fixedly arranged on the base;

wherein the left upright column is sleeved with the left upper transverse measuring rod and the left lower transverse measuring rod sequentially from top to bottom in a mode of movable regulation;

wherein the left upper telescopic inductive sensor is fixedly connected with the left upper transverse measuring rod;

wherein the left lower telescopic inductive sensor is fixedly connected with the left lower transverse measuring rod;

wherein the right upright column is sleeved with the right upper transverse measuring rod and the right lower transverse measuring rod sequentially from top to bottom in a mode of movable regulation;

wherein the right upper lever type inductive sensor is fixedly connected with the right upper transverse measuring rod; and wherein the right lower lever type inductive sensor is fixedly connected with the right lower transverse measuring rod.

* * * * *